US012585248B2

(12) United States Patent
Maschmeyer et al.

(10) Patent No.: US 12,585,248 B2
(45) Date of Patent: Mar. 24, 2026

(54) AUGMENTED REALITY (AR)-BASED MANAGEMENT OF MANUAL ASSEMBLY PROCESSES

(71) Applicant: Shopify Inc., Ottawa (CA)

(72) Inventors: Russ Maschmeyer, Berkeley, CA (US); Eric Andrew Florenzano, San Francisco, CA (US); Brennan Letkeman, Calgary (CA); Diego Macario Bello, Montreal (CA); Daniel Beauchamp, Toronto (CA); Neil Leonard Padgett, Toronto (CA); Hettige Ray Perera Jayatunga, Toronto (CA); James Lepp, Ottawa (CA); Andrew Nhat-Nam Ngo, Toronto (CA)

(73) Assignee: Shopify Inc., Ottawa (CA)

( * ) Notice: Subject to any disclaimer, the term of this patent is extended or adjusted under 35 U.S.C. 154(b) by 506 days.

(21) Appl. No.: 18/188,657

(22) Filed: Mar. 23, 2023

(65) Prior Publication Data

US 2024/0241503 A1      Jul. 18, 2024

Related U.S. Application Data

(60) Provisional application No. 63/480,147, filed on Jan. 17, 2023.

(51) Int. Cl.
G05B 19/418        (2006.01)
G06T 19/00         (2011.01)

(52) U.S. Cl.
CPC .   *G05B 19/41805* (2013.01); *G05B 19/41885* (2013.01); *G06T 19/006* (2013.01); *G05B 2219/32014* (2013.01)

(58) Field of Classification Search
CPC ........ G05B 19/41885; G05B 19/41805; G05B 2219/32014; G06T 19/006
See application file for complete search history.

(56) References Cited

U.S. PATENT DOCUMENTS

| 2009/0198365 A1* | 8/2009 | Seaman | ........... G05B 19/41805 700/116 |
| 2012/0075343 A1* | 3/2012 | Chen | ......................... G06T 7/73 345/633 |
| 2012/0310693 A1* | 12/2012 | Rataul | .............. G05B 19/41805 705/7.14 |
| 2018/0082480 A1* | 3/2018 | White | .................... A61B 50/20 |
| 2023/0179641 A1* | 6/2023 | Bauer | .................. G06F 3/1454 709/227 |
| 2023/0326143 A1* | 10/2023 | Althobaiti | .......... H04N 21/4312 |

* cited by examiner

*Primary Examiner* — Mong-Shune Chung
(74) *Attorney, Agent, or Firm* — Rowand LLP

(57) ABSTRACT

A computer-implemented is disclosed. The method includes: obtaining image data from a plurality of cameras providing views of a designated assembly zone; updating a three-dimensional model of an assembly of a structure based on the obtained image data; and determining a location of a first component of the structure based on the updated three-dimensional model of the assembly.

20 Claims, 11 Drawing Sheets

200

Augmented Reality (AR) Engine 210

3D Modeling Module 212

Image Analysis Module 214

AR Scene Generation Module 216

Network
250

Augmented Reality (AR)
Device 220

Cameras 222

Obtain image data from a plurality of cameras providing views of a designated assembly zone
502

Update a three-dimensional model of an assembly of a structure based on the obtained image data 504

Determine a location of a first assembly part of the structure based on the updated three-dimensional model of the assembly 506

500

700

Determine positions of assemblers in an assembly zone 702

For each assembly instruction, determine a set of steps and locations of assembly parts 704

Determine assignment criteria associated with the assembly instructions 706

Generate assignment of assembly instructions to the assemblers based on location data and the assignment criteria 708

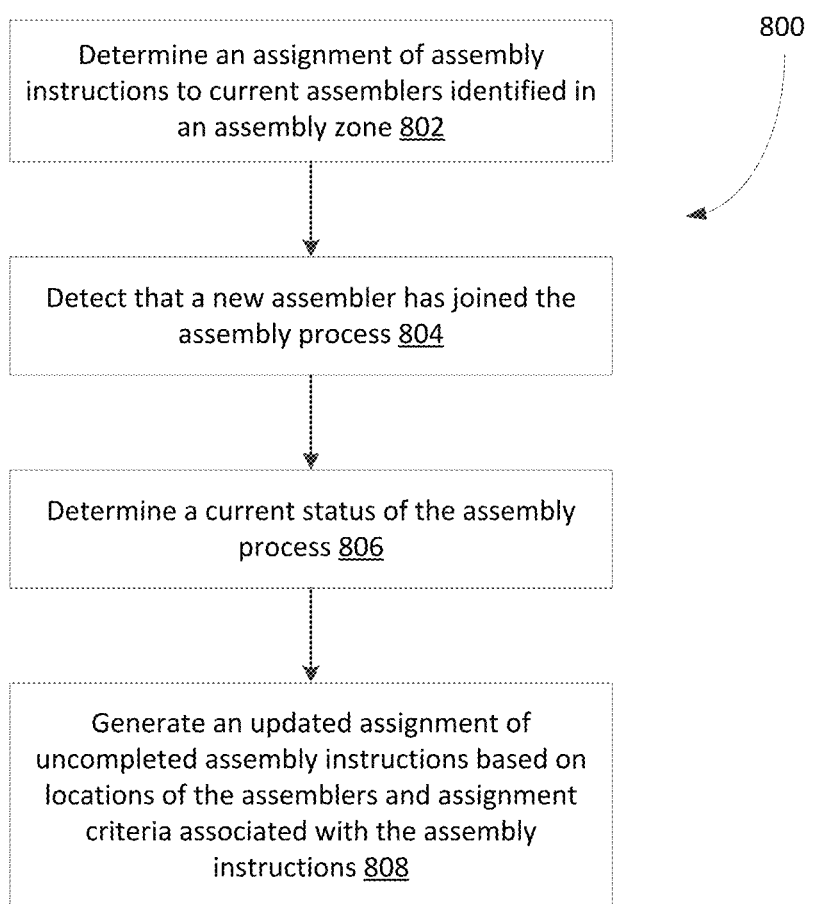

800

Determine an assignment of assembly instructions to current assemblers identified in an assembly zone 802

Detect that a new assembler has joined the assembly process 804

Determine a current status of the assembly process 806

Generate an updated assignment of uncompleted assembly instructions based on locations of the assemblers and assignment criteria associated with the assembly instructions 808

FIG. 8

AUGMENTED REALITY (AR)-BASED MANAGEMENT OF MANUAL ASSEMBLY PROCESSES

CROSS-REFERENCE TO RELATED APPLICATION

The present application claims the benefit of priority to U.S. Provisional Patent Application No. 63/480,147 filed on Jan. 17, 2023, the contents of which are incorporated herein by reference.

TECHNICAL FIELD

The present disclosure relates to augmented reality and, in particular, to systems and methods for managing manual assembly processes using augmented reality.

BACKGROUND

Augmented reality (AR) systems may be deployed to facilitate manual assembly processes, i.e., composing previously manufactured components or sub-assemblies into completed products. For example, an AR system may provide users with visual guidance in the form of real-time assembly instructions during manual assembly of multi-component structures, such as furniture, industrial machines, and the like.

BRIEF DESCRIPTION OF THE DRAWINGS

Embodiments will be described, by way of example only, with reference to the accompanying figures wherein:

FIG. 8 shows, in flowchart form, an example method for dynamically updating a three-dimensional (3D) model associated with a manual assembly process using AR;

Like reference numerals are used in the drawings to denote like elements and features.

DETAILED DESCRIPTION OF EMBODIMENTS

Figure 1:
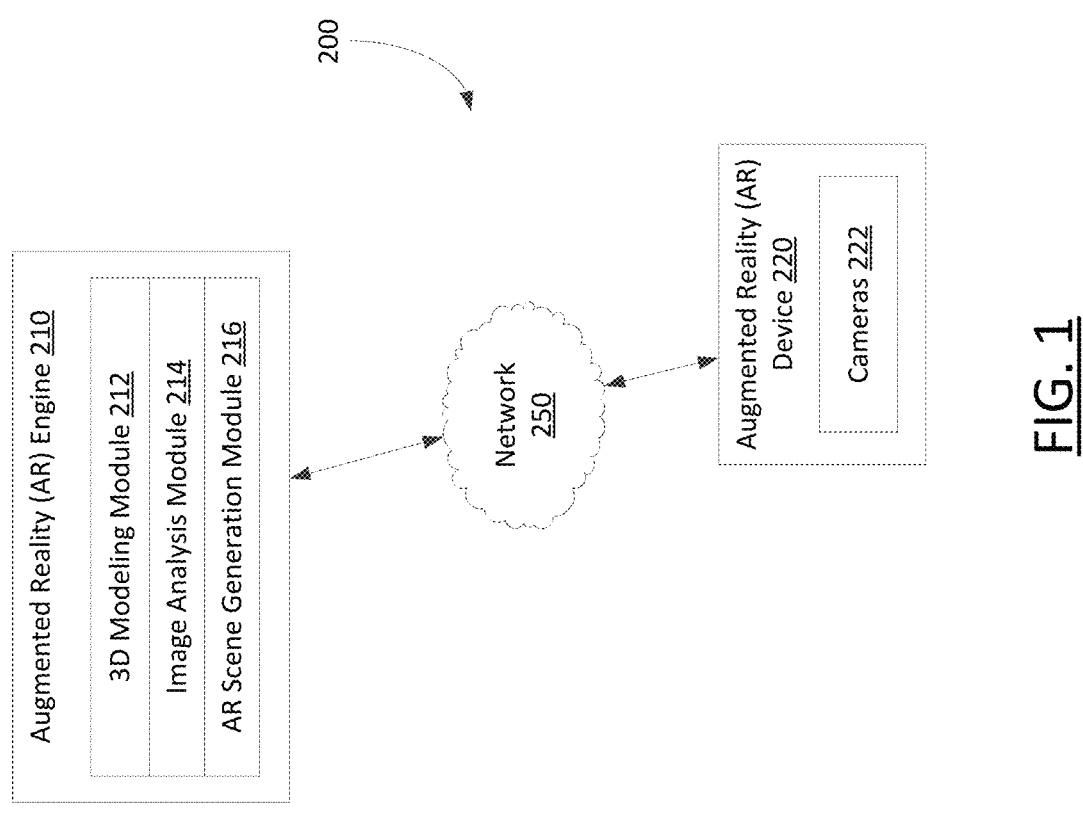
FIG. 1 illustrates an example system for AR-based management of manual assembly processes.

In an aspect, the present application discloses a computer-implemented method. The method includes: obtaining image data from a plurality of cameras providing views of a designated assembly zone; updating a three-dimensional model of an assembly of a structure based on the obtained image data; and determining a location of a first component of the structure based on the updated three-dimensional model of the assembly.

In some implementations, the plurality of cameras may include cameras associated with augmented reality devices that are detected to be in or within a vicinity of the assembly zone.

In some implementations, the plurality of cameras may include one or more cameras that are statically positioned in or within a vicinity of the assembly zone.

In some implementations, determining the location of the component may include: identifying a first subregion of the assembly zone using the updated three-dimensional model; and performing image analysis of video feeds of one or more cameras providing a view of the first subregion.

In some implementations, the method may further include: receiving a request to locate the first component; and responsive to receiving the request, presenting, via an AR device associated with an assembler in the assembly zone, an indication of the location of the component.

In some implementations, the method may further include, before receiving a request to locate the first component: obtaining subsequent image data from the plurality of cameras; based on the obtained subsequent image data, determining that the first component is not at the location; and updating the three-dimensional model to include an indicator of the first component at the first location.

In some implementations, the indication may include a graphical indicator of the location of the component that is overlaid on a view of the real-world space.

In some implementations, the method may further include: identifying assemblers associated with the assembly of the structure; and determining positions of the identified assemblers with respect to each other and constituent parts of sub-assemblies of the assembly.

In some implementations, identifying the assemblers may include detecting that an assembler has joined a first assembly process.

In some implementations, detecting that an assembler has joined the first assembly process may include detecting one or more of: input of a code; login to a shared project space; a defined object in a camera feed associated with the assembler; defined audio cues; or calibration by contact.

In some implementations, identifying the assemblers may include determining that one or more entities that are prompted to join a first assembly process based on their current locations have joined the first assembly process.

In some implementations, the method may further include determining, for each of one or more of the identified assemblers, a respective subset of all assembly instructions to assign to the assembler.

In some implementations, the method may further include causing to be displayed, via an AR device associated with the assembler, virtual guidance corresponding to the respective subset of assembly instructions.

In some implementations, the method may further include: monitoring completion progress of the identified assemblers in completing their respective assigned assembly tasks; and based on the monitoring, determining subsequent assembly instructions for assigning to one or more of the identified assemblers.

In some implementations, the method may further include: identifying a first one of the assemblers to receive location information for the first components; and causing to be displayed, via an AR device associated with the first assembler, a graphical indication of the location of the first component.

In some implementations, the first one of the assemblers may be identified based on determining proximity of one or more of the identified assemblers to the location of the first component.

In some implementations, the first one of the assemblers may be identified based on determining an identity of an assembler to receive assembly instructions associated with the first component.

In another aspect, the present application discloses a computing system. The computing system includes a processor and a memory coupled to the processor. The memory stores computer-executable instructions that, when executed, configure the processor to: obtain image data from a plurality of cameras providing views of a designated assembly zone; update a three-dimensional model of an assembly of a structure based on the obtained image data; and determine a location of a first component of the structure based on the updated three-dimensional model of the assembly.

In another aspect, the present application discloses a non-transitory, computer-readable medium storing computer-executable instructions that, when executed by a processor, configure the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extended by connecting one or more additional sales channels representing platforms where products can be sold. In particular, the sales channels may themselves be e-commerce platforms, such as Facebook Shops™, Amazon™, etc.

Real-Time Management of Manual Assembly Processes Using AR

Manual assembly comprises operations that are performed—primarily by human operators or assemblers—in order to join components by manual methods for forming sub-assemblies and products. AR-based solutions may be deployed to facilitate management of manual assembly processes. While AR technologies enable digitization of assembly instructions and efficient guidance of complex assembly tasks, existing AR systems are not well-suited for multi-party assembly scenarios in which multiple individuals participate in the assembly of parts. Some of the challenges for these AR systems include: coordinating start times of assemblers for working on different sub-assemblies; managing assignment of steps that are dependent on the completion of other components and sub-assemblies; and navigating unexpected changes in the number and identities of assemblers in the course of an assembly process.

The present application discloses a system for managing delivery of assembly instructions in a multi-party assembly process using AR. The proposed system leverages use of AR and image analysis techniques for locating assemblers and parts of an assembly, and delivering assembly instructions in real-time during a manual assembly process. Specifically, the proposed system is configured to detect positions of the assemblers relative to the components of sub-assemblies and to timely deliver assembly instructions to the correct assemblers based on monitoring the completion progress of assembly steps.

In at least some embodiments, the proposed system may generate a 3D model representing a multi-party assembly in real-world space. A 3D model of an assembly may be generated based on image data of video feeds from cameras associated with AR devices worn by assemblers. The 3D model data may comprise information about the current status of the assembly process such as current locations of parts, positions of assemblers relative to each other and to one or more parts, completion status of sub-assemblies, tools required to perform assembly tasks, and the like. The 3D model data may also comprise information about the structure that is to be built. In particular, the 3D model may indicate, among others: components of the structure; relationships between connected, linked, or otherwise related components and sub-assemblies; order of assembly of components; and the like.

The proposed system may update the 3D model dynamically. In particular, the 3D model data may be updated in real-time based on, for example, user input and image data of live video feeds from cooperating AR headsets/cameras providing views of the assembly zone. The 3D model may thus enable effective capture of up-to-date information about a manual assembly process and associated assembly zone(s). In some embodiment, the 3D model data may also comprise current information about the real-world space, such as its dimensions, any surfaces present (e.g., floor, table, etc.), and any other physical constraints (e.g., walls, objects, etc.) that could affect manual assembly.

The present application discloses a system that is designed to provide an AR-guided assembly experience. The proposed system detects/identifies assemblers that are associated with an assembly zone. Assemblers may join an existing assembly process on their own, or they may be prompted by the proposed system to join the assembly process. For example, the proposed system may detect that an individual is near another assembler or a designated assembly zone. An individual may join, or be prompted to join, an assembly process as an assembler based on one or more of: manual input of defined input data (e.g., QR code); object recognition of specific component(s) in a video feed associated with the individual; login to a shared project space; input of shared data; calibration by contact (e.g., "high five", device contact); audio cues/beacons; Wi-Fi® discoverability; shared spatial anchors; and the like.

The proposed system is configured to determine the positions of assemblers relative to each other and constituent parts of sub-assemblies. The positions of assemblers may be determined based on, for example, image data of video feeds across all or a subset of relevant cameras (e.g., static overhead cameras, AR devices of assemblers, etc.), sensor data of AR devices (e.g., gyroscope), or other location tracking systems. The assemblers' positions may then be compared with detected and/or tracked components and sub-assemblies. The components and sub-assemblies belonging to an assembly may be detected, for example, based on parsing image frames from cameras associated with AR devices using object detection techniques.

The proposed system determines, based on the positions of assemblers relative to constituent parts of sub-assemblies, which instructions in a set of all assembly instructions to assign to the assemblers. The set of assembly instructions may comprise an ordered procedural list of assembly tasks. The list of assembly tasks may include an initial task (or tasks) associated with unpacking and/or laying out at least a subset of the constituent parts in a real environment prior to assembling the structure. The initial arrangement and physical location choices of the constituent parts may depend on, for example, the physical dimensions and constraints of the assembly area, the number of assemblers, and the like. The assignment of assembly instructions may take into account, among others: identifying information of assemblers, indicating skills, expertise, past assembly experience, and/or knowledge of relevant tools, techniques, and systems; dependencies of assembly steps; and proximity of assemblers to tools and/or components of the assembly. In some embodiments, the order of assembling a structure, i.e., order of assembly tasks, may be procedurally based on a machine learning model. For example, an ML model may be used for physics-based simulation of dismantling a structure (e.g., a completed product), and the dismantling may be reversed to identify relevant sub-assembly steps for assembling the structure.

The proposed system is configured to display AR content in connection with a manual assembly process. In particular, the proposed system may provide AR content comprising virtual guidance data to display via AR devices associated with assemblers based on assignment of assembly instructions. The virtual guidance may for example, be in the form of animations (or other graphical representation) of virtual components, on-screen text of assembly instructions, audio output, and the like. The graphical representations may be dynamic; for example, they may be anchored to the locations of parts, sub-assemblies, and tools in the display of the AR content.

The proposed system continuously monitors the progress of the assemblers in completing their assigned assembly tasks to determine when each assembly step has been completed, e.g., a sub-assembly has been correctly assembled. For example, in some embodiments, the proposed system may determine that a sub-assembly is complete if the components associated with the sub-assembly collectively satisfy a spatial constraint or requirement, i.e., positioned in the correct position/orientation relative to assembler(s), environment, other components, or other sub-assemblies. Upon detecting completion of a sub-assembly or an assembly step, the proposed system determines a next instruction to assign from the set of all assembly instructions and an identity of an assembler to whom the assembly instruction is to be assigned.

Additionally, or alternatively, the proposed system may while or as a result of updating the 3D model of the multi-party assembly, determine that an object (e.g., a part or a sub-assembly) is not where the object had previously been recorded to be within the 3D model. For example, the proposed system may have determined from an earlier video feed (e.g., from a first cooperating AR headset/camera) that a component was at a first location in the 3D model, and upon receiving a second video feed corresponding to that first location, determine that the component is no longer there (e.g., because it had been moved).

The proposed system may respond to such a determination, e.g., immediately or after a threshold amount of time has elapsed. For example, the proposed system may cause an alert to be displayed by one or more of the cooperating AR headsets/cameras, such as "have you seen this part" with an accompanying illustration. Additionally, or alternatively, the proposed system may add a placeholder for the missing component to the 3D model (e.g., an outline or illustration of the component at a most recently recorded location of the component) to, for example, assist in a search for the component.

The proposed system may also be configured to perform searches for the missing component in subsequent video feeds. Upon locating the component in, e.g., a third video feed from a cooperating AR headset/camera, the proposed system may update the 3D model to include, at the first location, an indication that the component had been moved. For example, the proposed system may update the 3D model to include, at the first location, an outline or illustration of the component and/or an arrow appearing to point to the component's new location in real-world space. The proposed system may additionally or alternatively, clear any alerts associated with the previously missing component.

Reference is first made to FIG. 1, which illustrates, in block diagram form, an example system 200 for AR-based management of manual assembly processes. As shown in FIG. 1, the system 200 may include an AR engine 210, AR devices 220, and a network 250 connecting one or more of the components of system 200. The AR engine 210 and the AR devices 220 may all communicate via the network 250. In at least some embodiments, each of the AR devices 220 may be a computing device. The AR devices 220 may take a variety of forms such as, for example, a mobile communication device such as a smartphone, a tablet computer, a wearable computer (such as smart glasses, augmented reality/mixed reality headset, etc.), a laptop or desktop computer, or a computing device of another type.

The AR device 220 is a computing device that is adapted for providing an augmented reality experience. Specifically, the AR device 220 is configured to combine real-world and computer-generated content, by augmenting a view of a real-world environment with virtual overlay data. The AR device 220 may take various forms such as an optical see-through display, a video see-through display, a handheld device (e.g., a smartphone), a digital projector, or the like. In at least some embodiments, an AR device 220 may be suited for being worn or handled by an operator/assembler associated with a manual assembly process. The AR device 220 may for example, be used for viewing a real-world assembly zone and any virtual content that is overlaid on a view of the assembly zone.

As shown in FIG. 1, the AR device 220 includes certain sensors, such as cameras 222, that can be used to collect sensor data. The sensors of the AR device 220 may include, for example, cameras, LiDAR scanners, microphones, accelerometers, GPS, eye trackers, hand trackers, and the like. The sensors may be configured to capture data for use in generating AR scenes of real-world environments. A user may capture live image or video data depicting their real-world surrounding space using their AR device 220, and the captured image/video data may be overlaid with computer-generated information to generate AR scenes depicting the real-world space. Using their AR device 220, a user can view, edit, manipulate, and otherwise interact with AR scenes featuring objects of interest. In particular, the AR device 220 and associated sensors may be configured to detect, capture, and recognize user input, such as speech, hand gestures, etc., as a user interacts with their real-world environment.

An AR engine 210 is provided in the system 200. The AR engine 210 may be a software-implemented component containing processor-executable instructions that, when executed by one or more processors, cause a computing system to carry out some of the processes and functions described herein. In some embodiments, the AR engine 210 may be provided as a stand-alone service. For example, a computing system may engage the AR engine 210 as a service that facilitates providing an augmented reality experience for users of the AR devices 220.

The AR engine 210 supports generation of AR content, such as AR scenes of real-world spaces. The AR engine 210 is communicably connected to one or more AR devices 220. Sensor data from AR devices 220 may be used in generating AR content. For example, AR devices 220 may transmit captured camera and LiDAR scanner data directly to the AR engine 210, or camera/LiDAR scanner data from AR devices 220 may be received at the AR engine 210 via an intermediary computing system. The AR scene data generated by the AR engine 210 may be transmitted, in real-time, to the AR device 220 for viewing thereon. For example, the AR engine 210 may be configured to generate and transmit, to the AR device 220, virtual overlay data associated with AR scenes. That is, the AR engine 210 may provide virtual information which may be displayed, via AR devices 220, as overlay on a view of a real-world environment.

As shown in FIG. 1, the AR engine 210 may include a 3D modeling module 212, an image analysis module 214, and an AR scene generation module 216. The modules may comprise software components that are stored in a memory and executed by a processor to support various functions of the AR engine 210.

The 3D modeling module 212 may perform operations for constructing, editing, storing, and manipulating 3D models of real-world subjects. A real-world subject may be a person, a physical item, or a real-world space. The 3D modeling module 212 may obtain information (e.g., image and video data, measured range/depth data, etc.) about a real-world subject and generate a virtual 3D representation of the subject based on the obtained information. In at least some embodiments, the real-world subject information may comprise output data of sensors such as, for example, cameras, LiDAR scanners, microphones, eye trackers, hand trackers, and the like, associated with AR devices 220.

The image analysis module 214 may analyze images that are stored and/or obtained by the AR engine 210. The image analysis module 214 receives images, videos, etc., as input, and outputs various information regarding the images. Various algorithms may be included in or implemented by the image analysis module 214—non-limiting examples of such algorithms include: object recognition algorithms, image segmentation algorithms; surface, corner, and/or edge detection algorithms; and motion detection algorithms. In particular, the image analysis module 214 may be configured to detect objects in images (e.g., frames of a video) and identify features of the detected objects.

The AR scene generation module 216 may generate AR content. An AR scene comprises a combination of real and virtual (i.e., computer-generated) information. The AR scene generation module 216 may generate virtual content (e.g., animations, text, etc.) for overlaying on a view of a real-world space in AR. The AR scene generation module 216 determines how to align the virtual content with the real-world space. In at least some embodiments, virtual content may be anchored to displays of real-world objects in AR scenes. For example, the AR scene generation module 216 may be configured to determine positions, in 3D, of virtual content items relative to real-world objects. The virtual content and associated display data (e.g., relative position data) may be provided to AR devices 220 for display thereon or other devices. For example, the AR content may be provided to head-mounted displays worn by users or to a digital projector for projection mapping to real-world surfaces.

The AR engine 210 and the AR devices 220 may be in geographically disparate locations. Put differently, the AR devices 220 may be remote from the AR engine 210. As described above, the AR devices 220 and the AR engine 210 may be, or integrated with, computing systems.

The network 250 is a computer network. In some embodiments, the network 250 may be an internetwork such as may be formed of one or more interconnected computer networks. For example, the network 250 may be or may include an Ethernet network, an asynchronous transfer mode (ATM) network, a wireless network, or the like.

In some example embodiments, the AR engine 210 may be integrated as a component of an e-commerce platform. That is, an e-commerce platform may be configured to implement example embodiments of the AR engine 210. In particular, the subject matter of the present application, including example methods for AR-based management of manual assembly processes disclosed herein, may be employed in the specific context of e-commerce. For example, the example methods described in the present application may be implemented to provide a guided manual assembly experience for customers, distributors, or merchants of products that are offered via an e-commerce platform.

Figure 2:
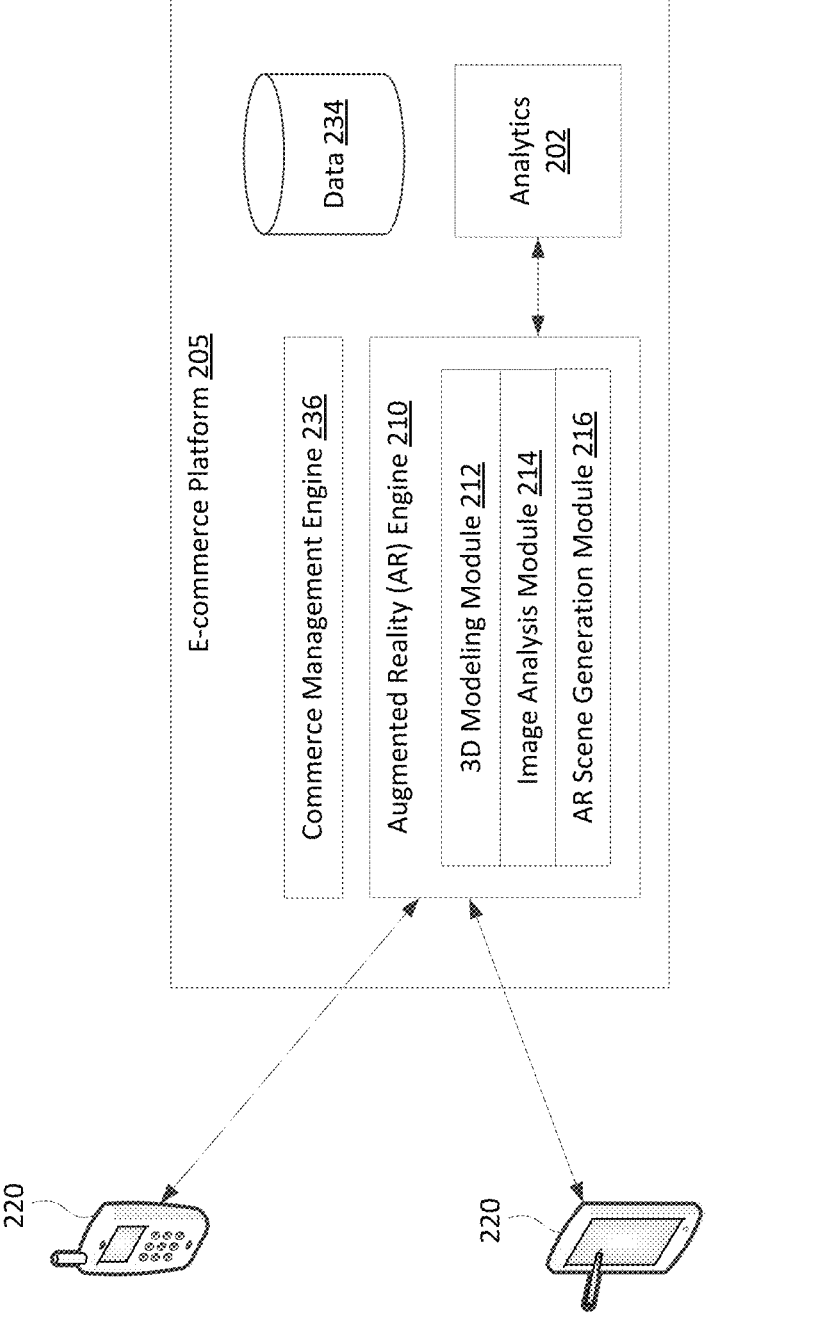
FIG. 2 is a block diagram of an e-commerce platform that is configured for implementing example embodiments of the AR engine of FIG. 1.
Figure 3:
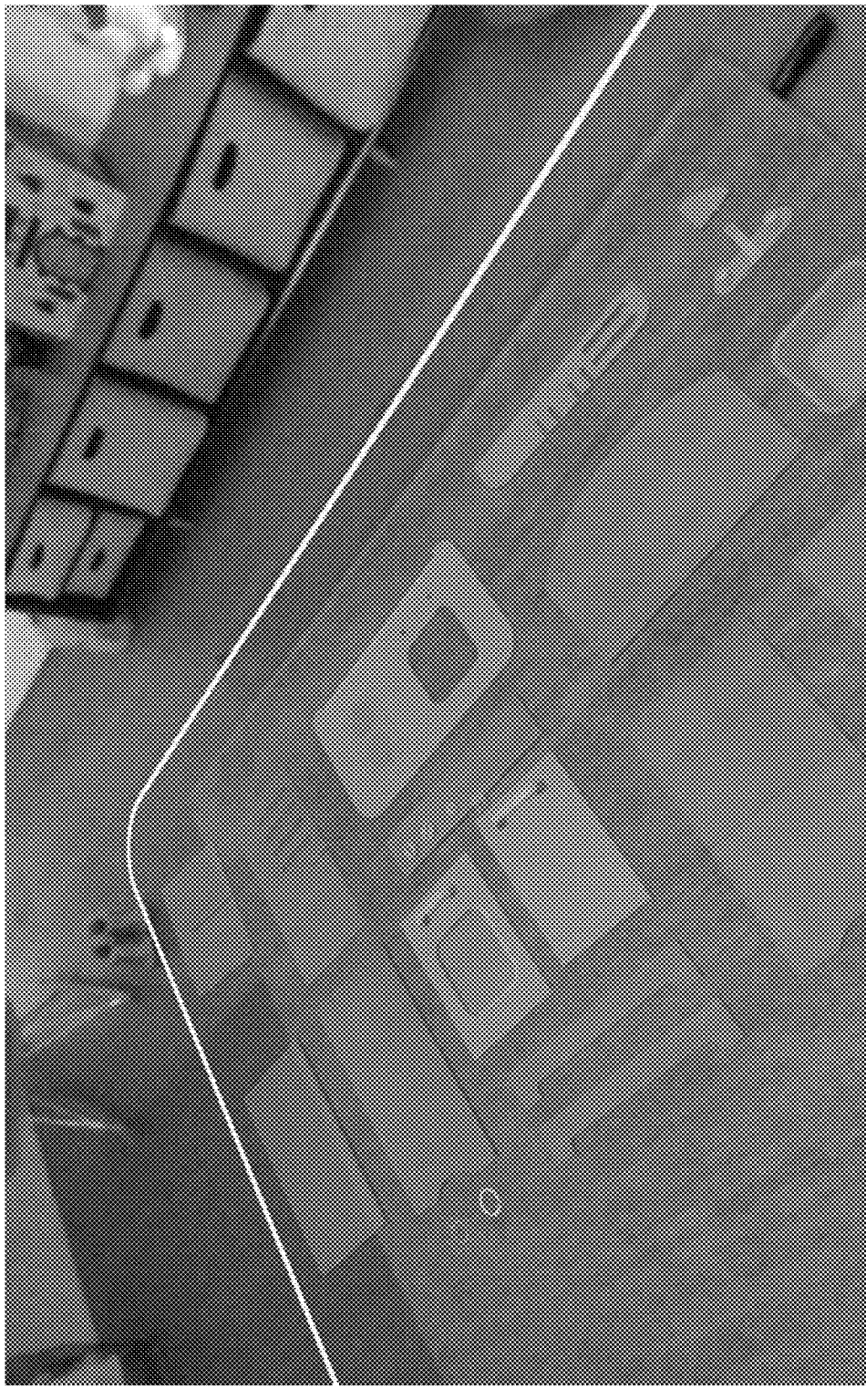
FIG. 3 shows a view of an example assembly zone including an initial arrangement of assembly parts of a sub-assembly.
Figure 4:
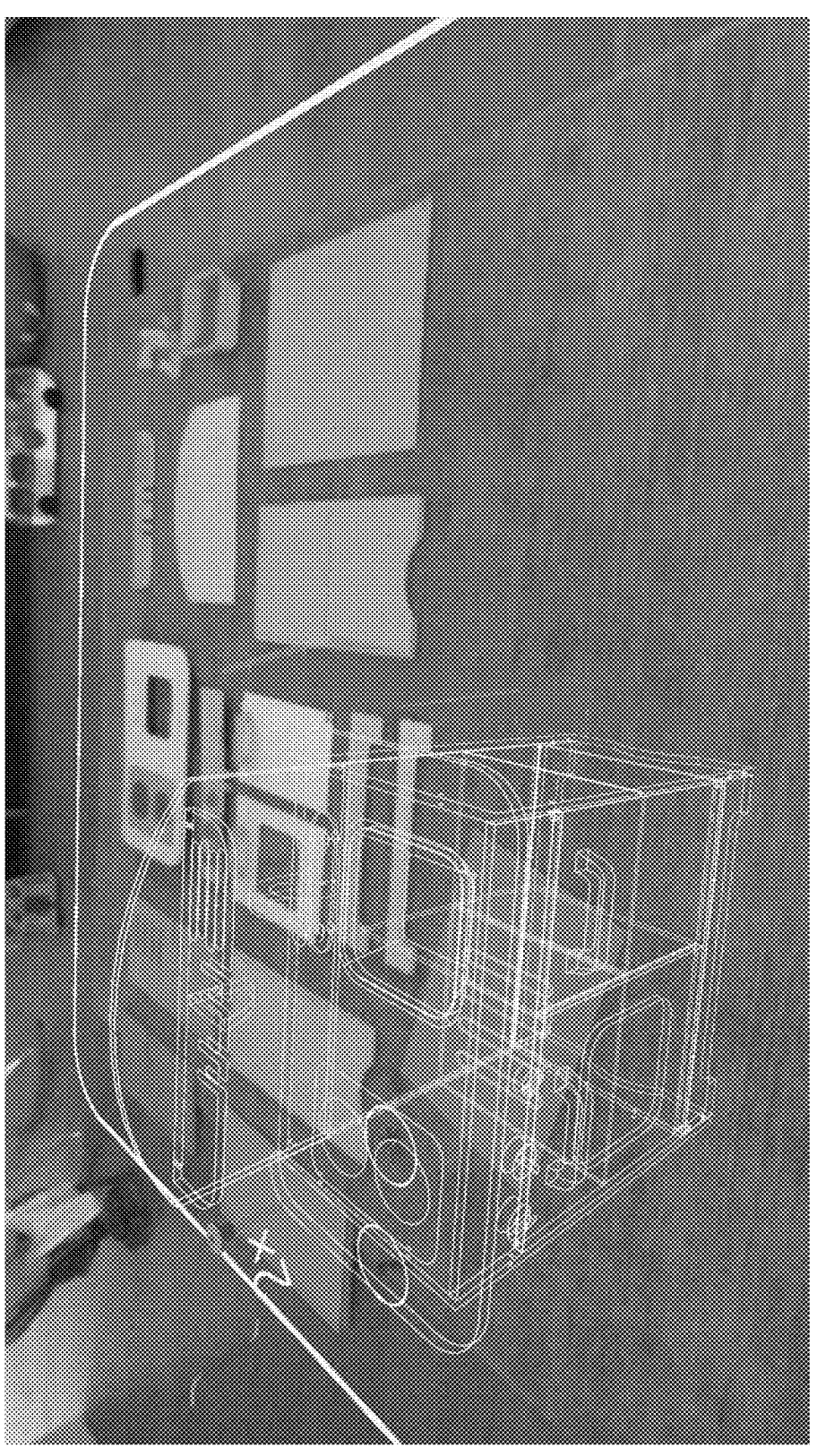
FIG. 4 shows an augmented view of the example assembly zone of FIG. 3.

Reference is made to FIG. 2 which illustrates an example embodiment of an e-commerce platform 205 that implements an AR engine 210. The AR devices 220 may be communicably connected to the e-commerce platform 205. In at least some embodiments, the AR devices 220 may be associated with accounts of the e-commerce platform 205. Specifically, the AR devices 220 may be associated with individuals that have accounts in connection with the e-commerce platform 205. For example, one or more AR devices 220 may be associated with customers having e-commerce accounts or merchants that are associated with one or more online stores on the e-commerce platform 205. The e-commerce platform 205 may store indications of associations between AR devices and customers or merchants of the e-commerce platform, for example, in the data facility 134.

The e-commerce platform 205 includes a commerce management engine 236, an AR engine 210, a data facility 234, and a data store 202 for analytics. The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts.

The functionality described herein may be used in commerce to provide improved customer or buyer experiences. The e-commerce platform 205 may implement the functionality for any of a variety of different applications, examples of which are described herein. Although the AR engine 210 of FIG. 2 is illustrated as a distinct component of the e-commerce platform 205, this is only an example. An engine could also or instead be provided by another component residing within or external to the e-commerce platform 205. In some embodiments, one or more applications that are associated with the e-commerce platform 205 may provide an engine that implements the functionality described herein to make it available to customers and/or to merchants. Furthermore, in some embodiments, the commerce management engine 236 may provide that engine. However, the location of the AR engine 210 may be implementation specific. In some implementations, the AR engine 210 may be provided at least in part by an e-commerce platform, either as a core function of the e-commerce platform or as an application or service supported by or communicating with the e-commerce platform. Alternatively, the AR engine 210 may be implemented as a stand-alone service to clients such as a customer's AR device. For example, an AR device could store and run an engine locally as a software application.

The AR engine 210 is configured to implement at least some of the functionality described herein. Although the embodiments described below may be implemented in association with an e-commerce platform, such as (but not limited to) the e-commerce platform 205, the embodiments described below are not limited to e-commerce platforms.

The data facility 234 may store data collected by the e-commerce platform 205 based on the interaction of merchants and customers with the e-commerce platform 205. Merchants may provide data, for example, through their online sales activity. Examples of merchant data include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data may be obtained on the basis of inputs received via AR devices associated with the customers and/or prospective purchasers. By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 205 by merchants and customers (or prospective purchasers) may be collected and stored in the data facility 234.

The data facility 234 may include customer preference data for customers of the e-commerce platform 205. For example, the data facility 234 may store account information, order history, browsing history, and the like, for each customer having an account associated with the e-commerce platform 205. The data facility 234 may additionally store, for a plurality of e-commerce accounts, wish list data and cart content data for one or more virtual shopping carts.

Figure 5:
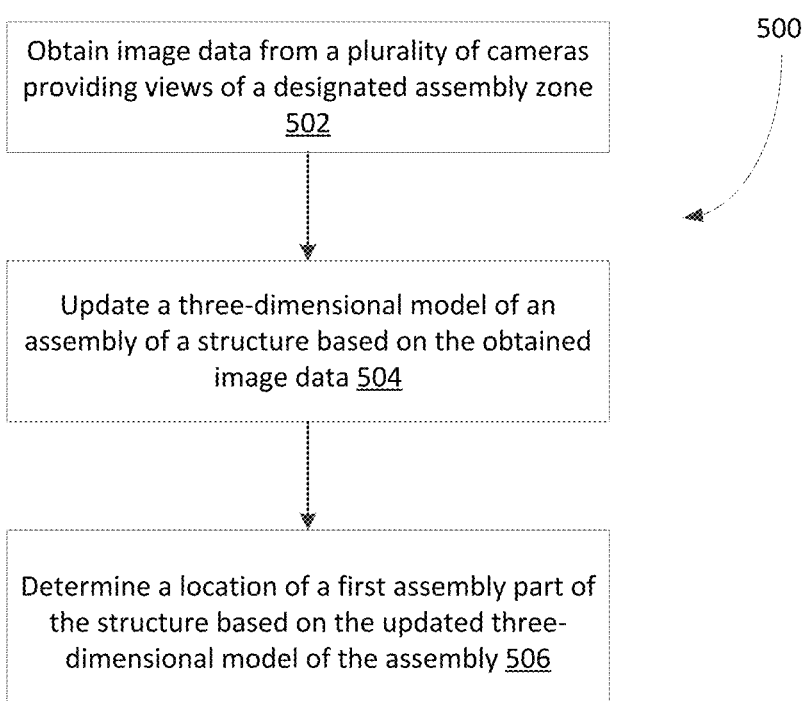
FIG. 5 shows, in flowchart form, an example method for determining locations of assembly parts in a manual assembly process.

Reference is now made to FIG. 5, which shows, in flowchart form, an example method 500 for determining locations of assembly parts of a manual assembly process using AR. The method 500 may be performed by a computing system that supports generation of AR content, such as the AR engine 210 of FIG. 1. As detailed above, an AR engine may be a service that is provided within or external to an e-commerce platform. An AR engine may implement the operations of method 300 as part of a process for delivering assembly instructions during a manual assembly process.

AR-enabled computing devices ("AR devices") may be used to visualize a real-world space. In the manufacturing context, operators or assemblers that are engaged in manual assembly of a product may use AR devices to assist their work. Specifically, AR devices may provide assemblers with an augmented view of an assembly environment or zone. By way of example, assembly instructions for assembling a product may be digitized and presented via AR devices that are worn or otherwise handled by human operators in the assembly zone. The assembly instructions may for example, be displayed as virtual overlay on a view of the real-world assembly zone. The terms "operators" and "assemblers" are used interchangeably herein to refer to individuals that are engaged in a manual assembly process.

In operation 502, the AR engine obtains image data from a plurality of cameras providing views of an assembly zone associated with a manual assembly process. The assembly zone refers to a defined physical space in which at least part of the assembly steps of manual assembly takes place. The assembly zone may comprise portions of one or more interior spaces within a building. Additionally, or alternatively, the assembly zone may be or include an outdoor space. For example, the assembly zone may include portions of an assembly line in a manufacturing plant, rooms in a house or office building, a garage, a parking lot or driveway, and the like.

The physical boundaries of the assembly zone depend on an initial arrangement of the components of a product being assembled. As part of the pre-assembly process, the required components (e.g., parts, modular sub-assemblies, etc.) of the product may be unpacked or otherwise separated from each other, and physically distributed in a confined space. For example, various parts for assembly may be laid out in an area of limited size on a work surface. The assembly zone may be defined so as to refer to a space (or spaces) that enclose a limited area in which the components are distributed prior to or during assembly.

The AR engine may obtain image data from various different types of cameras. In some embodiments, the cameras may be associated with AR devices. In particular, image data may be obtained via image sensors that are disposed on AR devices worn by assemblers of a manual assembly process. Such cameras may for example, be associated with AR devices that are detected to be in or within a vicinity of the assembly zone. Additionally, or alternatively, the AR engine may obtain image data from cameras that are statically positioned in or within a vicinity of the assembly zone. For example, image data may be obtained via security cameras that are mounted near the assembly zone and that are positioned to capture image data (e.g., photos, videos) depicting at least a portion of the assembly zone.

The image data may be obtained from the cameras periodically, continuously, or on demand. The AR engine may for example, receive image data in real-time from cameras associated with AR devices of operators that are engaged in an active manual assembly session. The image data may comprise video data of live videos that are streamed via AR devices used by operators in an assembly zone. In some embodiments, the AR engine may request to obtain image data from one or more of the plurality of cameras. Such requests for image data may be generated at defined times or time intervals, or upon manual input by one or more of the operators.

The AR engine is configured to generate a 3D model of the assembly. A 3D model is a representation of real-world information associated with a manual assembly process and related assembly zones. The 3D model may be generated based, at least in part, on output data of sensors that are associated with the assembly. The sensors may include, for example, cameras, LiDAR scanners, motion detectors, GPS, etc., which may be disposed in the assembly zone or in AR or other devices associated with the assemblers. The model data of the 3D model may be stored remotely of (or otherwise external to) the AR devices. For example, the 3D model data may be maintained at a computing system that is independent of, and communicably connected to, the AR devices. In some embodiments, the AR devices may retrieve and store the 3D model data locally, for example, in cache memory associated with the device. An AR device of an assembler may thus be configured to access, either locally or remotely, model data for a 3D model of a manual assembly in which the assembler is engaged.

In at least some embodiments, the 3D model may comprise a 3D representation of the real-world assembly zone. In particular, the 3D model may include representations of visual features, such as background, objects, etc., associated with an assembly zone. Image data from a plurality of cameras associated with multiple assemblers may be combined to generate the representations of visual features. The AR engine may determine camera position data indicating positions (e.g., location, orientation, etc.) of the cameras and build a 3D model of the assembly zone based on image data from the cameras that accounts for the camera position data. In some embodiments, image stitching techniques may be employed by the AR engine to combine images from cameras with overlapping fields of view of the assembly zone. The images may be combined to produce a segmented 3D representation depicting various visual features of the assembly zone.

Additionally, or alternatively, the 3D model data may include information about the current status of the manual assembly process. For example, the 3D model data may indicate, among others: current locations (e.g., position coordinates) of parts; current orientations/poses of parts (e.g., one or more angles relative to one or more references); positions of assemblers relative to each other and to one or more parts; completion status of components or sub-assemblies; tools required to perform assembly tasks; and the like. The 3D model data may also comprise information about the structure that is to be built. In particular, the 3D model data may indicate: components or sub-assemblies of the structure; relationships between connected, linked, or otherwise related components and sub-assemblies; order of assembly of components; and the like.

In operation 504, the AR engine updates the 3D model of the assembly based on image data obtained from the cameras providing views of the assembly zone. For example, the 3D model may be updated in real-time based on video data of live videos from cameras associated with a plurality of AR devices. In particular, the AR engine may detect changes in visual features associated with the assembly zone using video/image data depicting the assembly zone. The 3D model can then be updated to indicate any detected changes in visual features. The updates to the 3D model may correspond to changes in, for example, configuration or locations of parts, task completion status, or other physical representations associated with the manual assembly process.

The AR engine determines a location of a first component of the structure based on the updated three-dimensional model, in operation 506. In at least some embodiments, the AR engine may be configured to identify different subregions of the assembly zone using the updated 3D model, and to perform image analysis of images/videos depicting the subregions. Specifically, the AR engine may perform image analysis on video frames of live video from one or more cameras providing views of the subregions. Using object detection, the AR engine may recognize the first component in a video frame (or other image representation associated with the 3D model) and determine the location of the first component within the video frame. The location of the first component may in some embodiments, be represented in image coordinates which can then be converted to real-world coordinates using the parameters of the AR device's camera(s) and a suitable image-to-world transform.

In at least some embodiments, the AR engine may be configured to provide an indication of the location of the first component. The AR engine may for example, receive a request to locate the first component from an operator associated with the assembly process. The first component may be a part or sub-assembly that the operator requires for completing an assembly step that they have been assigned and as such, the operator may desire to determine the first component's current location. In response to receiving the request, the AR engine may present, via an AR device associated with the operator, a graphical indication of the location of the first component. In particular, the graphical indication may be presented as a virtual overlay on a view of the real-world assembly zone as seen using the AR device.

The locations of components may change from time to time during a manual assembly process. The AR engine may be configured to locate components in real-time such that operators are presented with up-to-date location data in connection with their assigned assembly tasks. In some embodiments, the AR engine may obtain image data from a plurality of cameras (e.g., cameras of AR devices) associated with the assembly zone at different times. The location of a particular component, as depicted in different video streams, may change. For example, the AR engine may determine from an earlier video stream, i.e., from a first AR device, that a component was at a first location within the 3D model and upon receiving a subsequent video stream corresponding to the first location, determine that the component is no longer there, i.e., moved from a previous location that was recorded within the 3D model for the first component. In response to determining that the component's location has changed, the AR engine may generate an indication of the change for presenting via AR devices. For example, the AR engine may cause an alert to be displayed on AR devices prompting for information regarding the "moved" component. Additionally, or alternatively, a placeholder for the component may be added to the 3D model of the assembly (e.g., an outline or illustration of the component situated where it was last seen or detected) to assist in a search for the component.

In some embodiments, the AR engine may also be configured to search for the component in subsequent video streams from AR devices. Upon locating the component, the AR engine may update the 3D model to include, at the previous recorded location, an indication that the component has been moved. For example, the 3D model may be updated to include, at the previous location, an outline or illustration of the component and a graphical indication of the change in location (e.g., an arrow) to a new location in real-world space.

Figure 6:
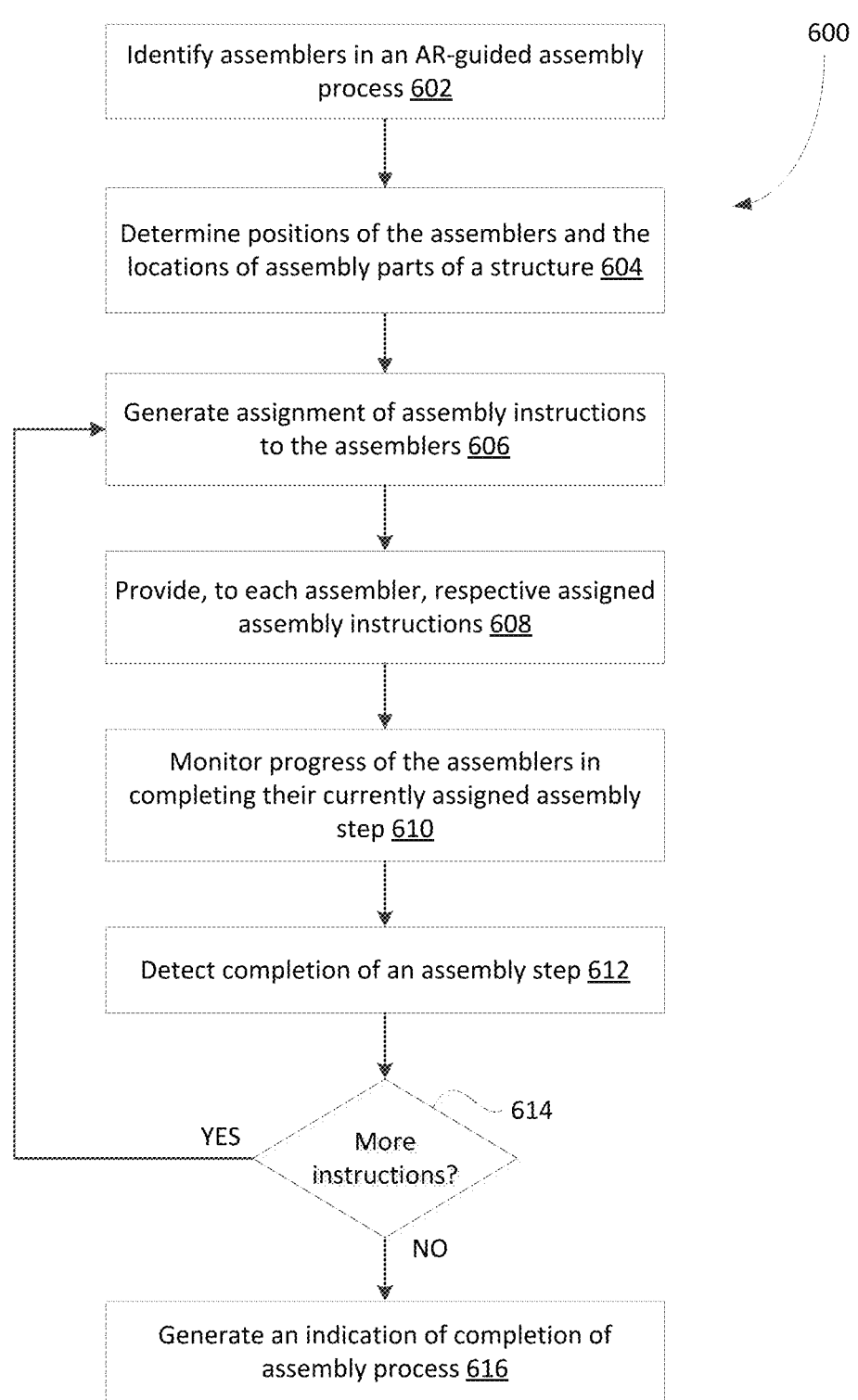
FIG. 6 shows, in flowchart form, an example method for managing assembly sequences of a manual assembly process using AR.

Reference is now made to FIG. 6, which shows, in flowchart form, an example method 600 for managing assembly sequences of a manual assembly process using AR. The method 600 may be performed by a computing system that supports generation of AR content, such as the AR engine 210 of FIG. 1. As detailed above, an AR engine may be a service that is provided within or external to an e-commerce platform. An AR engine may implement the operations of method 600 as part of a process for delivering assembly instructions during a manual assembly process. The operations of method 600 may be performed in addition to, or as alternatives of, one or more operations of method 500.

A manual assembly process may involve a plurality of individuals, or assemblers. An assembly (or sub-assembly) comprises a structured list of assembly steps, and each assembly step may consist of a set of tasks which must be completed. Assemblers are individuals that have capacity to perform the required tasks of one or more assembly steps. The AR engine identifies the assemblers of a manual assembly process, in operation 602. In particular, the AR engine may be configured to identify individuals that are engaged in, committed to, or otherwise available for participating in one or more assembly steps of the manual assembly process.

Assemblers may request to join an existing assembly process on their own, or they may be prompted by the AR engine to join the assembly process. For example, the AR engine may detect that an individual is near another assembler or a designated assembly zone. An individual may join, or be prompted to join (via a device associated with the individual), an assembly process as an assembler. An individual may be accepted or otherwise associated with an assembly process based on one or more of: manual input of predefined input data (e.g., QR code); object recognition of specific component(s) (e.g., parts, sub-assemblies) in video data associated with the individual; login to a shared project space; input of shared data, such as codewords; calibration by contact (e.g., "high five", tapping devices); audio cues/beacons; Wi-Fi® discoverability; shared spatial anchors; and the like.

In operation 604, the AR engine determines positions of the assemblers and the locations of assembly parts associated with the manual assembly process. In at least some embodiments, the AR engine may obtain model data of a 3D model for the assembly and determine the position/location information based on the 3D model data. As described with respect to method 500 of FIG. 5, the 3D model data may comprise current information regarding an assembly process which may be generated based on sensor output of a plurality of sensors (e.g., cameras, LiDAR scanners, etc.) that are associated with the assembly process and/or the identified assemblers (e.g., AR devices). Additionally, or alternatively, the 3D model data may incorporate tracking data obtained from other connected computing systems, such as indoor positioning systems, navigation systems, and the like. In particular, the real-time tracking data associated with the assemblers and/or components within the assembly zone(s) may be included as part of the 3D model data.

The AR engine generates an assignment of one or more assembly instructions to the assemblers, in operation 606. The set of assembly instructions may comprise an ordered procedural list of tasks to perform as part of a manual assembly process. The list of tasks may include an initial task (or tasks) associated with unpacking and/or laying out the components prior to assembly. The assembly instructions for a component or sub-assembly may include an indication of which parts are required. The physical location choices for the components and the instruction assignment for initially distributing the components may depend, for example, on the number of assemblers and the physical dimensions and constraints of the assembly zone. The AR engine determines, based at least in part on positions of the assemblers relative to the components (e.g., assembly parts, sub-assemblies, etc.) as initially distributed within the assembly zone which instructions in the set of all assembly instructions to assign to each assembler.

In at least some embodiments, the assignment of assembly instructions may depend on proximity of assemblers to components that are associated with (e.g., required for) various assembly steps. In particular, assembly instructions for tasks that are included as part of a particular assembly step may be assigned based on comparing physical distances between (1) one or more components associated with that assembly step, and (2) assemblers of the manual assembly process. The assembly instructions for an assembly step may be assigned to an assembler that is selected for being located closest to the initial or current locations of the required components of the assembly step. For example, the selected assembler may be associated with a minimum total distance (among all or a subset of assemblers) to the set of components that are required for the assembly step.

In some embodiments, the assignment of assembly instructions may additionally take into account other factors such as: profiles of assemblers, indicating expertise, past assembly experience, and knowledge of tools, techniques, systems; dependencies of assembly steps; and proximity of assemblers to tools and/or components. The AR engine may employ machine learning-based techniques in assigning the assembly instructions to assemblers. In some embodiments, the order of assembling the parts, i.e., order of assembly steps and/or tasks, may be procedurally based on a machine learning model. For example, an ML model may be used for physics-based simulation of dismantling a structure (e.g., an object), and the dismantling may be reversed to identify relevant sub-assembly steps.

The assembly instructions are then selectively assigned to the assemblers. Specifically, in operation 608, each assembler is provided with respective assigned assembly instructions based on the assignment generated by the AR engine. In at least some embodiments, the assembly instructions are presented in the form of virtual guidance on AR devices associated with the assemblers. The virtual guidance may be in the form of animations of virtual components, on-screen text, audio output, and the like. The animations may be dynamic; for example, they may be anchored to the locations of parts, sub-assemblies, and tools in the display.

The AR engine continuously monitors progress of the assemblers in completing their currently assigned assembly steps (operation 610). The AR engine may for example, obtain video data of live videos from AR devices of assemblers and perform image analysis of the video data. Based on the image analysis, the AR engine may determine progress or current status of the assembly of components or sub-assemblies by the relevant assembler as depicted in the videos.

In operation 612, the AR engine detects completion of an assembly step by an assembler. In some embodiments, a completion event may be detected based on user interaction. For example, user interaction such as hand gesture(s), selection of a virtual or real user interface element, or direct messages by an assembler may represent an indication that an assembly step has been completed by said assembler. Additionally, or alternatively, the AR engine may detect, based on image analysis of video data from one or more cameras with a view of the assembly zone, that certain defined spatial criteria associated with the components of an assembly step have been satisfied. For example, the AR engine may determine whether a set of parts for an assembly step, as depicted in a live video from an assembler's AR device, exhibit the correct completed position/orientation. The depicted position and orientation of the parts in video frames of the live video may be compared to images of known shape, configuration, pattern, and/or ornament associated with a completed sub-assembly.

The AR engine then determines whether there are any remaining assembly instructions that have yet to be assigned, in operation 614. If there are any unassigned assembly instructions, the method proceeds back to operation 606, and the AR engine assigns all or a subset of the unassigned assembly instructions to assemblers associated with the manual assembly process.

If, on the other hand, there are no more unassigned assembly instructions and all assembly steps have been determined to be completed, the AR engine generates an indication of completion of the manual assembly process, in operation 616. The indication may in some embodiments, comprise a message (e.g., a notification) to an operator or supervising entity associated with the assembly process for indicating that all of the assembly steps have been completed by the assemblers.

Figure 7:
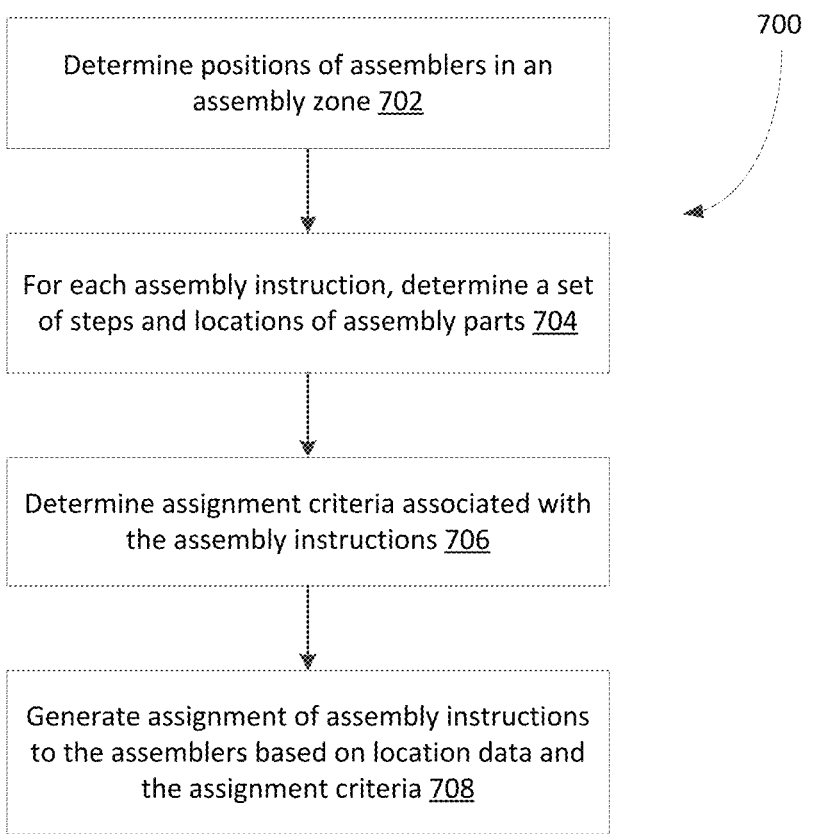
FIG. 7 shows, in flowchart form, another example method for managing assembly sequences of a manual assembly process using AR.

Reference is now made to FIG. 7, which shows, in flowchart form, another example method 700 for managing assembly sequences of a manual assembly process using AR. The method 700 may be performed by a computing system that supports generation of AR content, such as the AR engine 210 of FIG. 1. As detailed above, an AR engine may be a service that is provided within or external to an e-commerce platform. An AR engine may implement the operations of method 700 as part of a process for delivering assembly instructions during a manual assembly process. The operations of method 700 may be performed in addition to, or as alternatives of, one or more of the operations of methods 500 and 600.

An AR engine may be configured to provide a guided assembly experience for assemblers associated with a manual assembly process. In operation 702, the AR engine determines positions of the assemblers in an assembly zone. Specifically, the AR engine may determine the locations of the assemblers as well as relative positions of the assemblers with respect to each other. The positions of the assemblers may be determined in accordance with similar techniques described with reference to methods 500 and 600. In particular, the position data for the assemblers may be determined based on model data for a 3D model of the assembly which may include, among others, sensor output of sensors that are associated with the assemblers.

The AR engine also determines, for each of one or more assembly instructions associated with the manual assembly process, locations of components required for the assembly instruction and a set of assembly steps associated with the assembly instruction, in operation 704. An assembly instruction may comprise a list or sequence of tasks which must be completed for assembling a particular component (e.g., a sub-assembly). The collection of all assembly instructions for a manual assembly process may enable the assembly and combination of the sub-assemblies into a completed product.

In operation 706, the AR engine determines assignment criteria associated with the assembly instructions. Assignment criteria refer to defined criteria which may be used for determining the assignment of assembly instructions to the assemblers. In some embodiments, the assignment criteria may relate to completion status of assembly steps. An assembly step that requires two or more components, such as sub-assemblies, cannot be performed in the absence of said components. In particular, the assembly step (and associated tasks) may not be performed by an assembler unless and until the constituent components have been correctly assembled. Thus, an assembly instruction may be mapped to assignment criteria indicating the pre-conditions (e.g., completion of constituent sub-assemblies) for performing said assembly instruction.

In some embodiments, the assignment criteria may relate to the assemblers themselves. Specifically, the assignment criteria may comprise defined criteria relating to profiles of the assemblers, including skills, expertise, past assembly experience, and/or knowledge of relevant tools, techniques, and systems. Assembly instructions for specific assembly steps may demand certain skills and/or knowledge for successfully completing the required tasks. An assembly instruction may be mapped to assignment criteria indicating requisite or preferred assembler characteristics/traits for performing said assembly instruction.

The AR engine then generates assignment of assembly instructions to the assemblers based on location data of the assemblers and components and the assignment criteria, in operation 708. In particular, the assembly instructions may be assigned in accordance with the mappings of assembly instructions to defined pre-conditions and preferred/required assembler characteristics.

Reference is now made to FIG. 8, which shows, in flowchart form, an example method 800 for dynamically updating a three-dimensional (3D) model associated with a manual assembly process using AR. The method 800 may be performed by a computing system that supports generation of AR content, such as the AR engine 210 of FIG. 1. As detailed above, an AR engine may be a service that is provided within or external to an e-commerce platform. An AR engine may implement the operations of method 800 as part of a process for delivering assembly instructions during a manual assembly process. The operations of method 800 may be performed in addition to, or as alternatives of, one or more of the operations of methods 500 to 700.

A manual assembly process may comprise an initial set of assemblers. In operation 802, an AR engine determines an assignment of assembly instructions to current assemblers that are identified in an assembly zone. The assembly instructions may be delivered to the assemblers in accordance with various assignment criteria which may include, among others, proximity of assembler to constituent components, various defined assembly pre-conditions, and required or preferred assembler characteristics. The identified assemblers may proceed with performing their assigned instructions including assembly steps and associated tasks.

In operation 804, the AR engine detects that a new assembler has joined, or requested to join, the manual assembly process. For example, an individual may request to join an ongoing assembly process as an assembler based on processing of, among others: manual input of defined input data (e.g., QR code); object recognition of specific component(s) in a video feed associated with the individual; login to a shared project space; input of shared data; calibration by contact (e.g., "high five", device contact); audio cues/beacons; Wi-Fi® discoverability; shared spatial anchors; and the like.

The AR engine determines a current status of the assembly process, in operation 806. In at least some embodiments, the AR engine may be configured to determine completion progress of the assigned assembly instructions. For example, the AR engine may determine the progress of assembly of the sub-assemblies. Responsive to determining the current status of the assembly process, the AR engine generates an updated assignment of uncompleted assembly instructions, in operation 808. The updated assignment is based on locations of the updated set of assemblers (i.e., including the new assembler(s)) and assignment criteria associated with the assembly instructions.

Figure 9A:
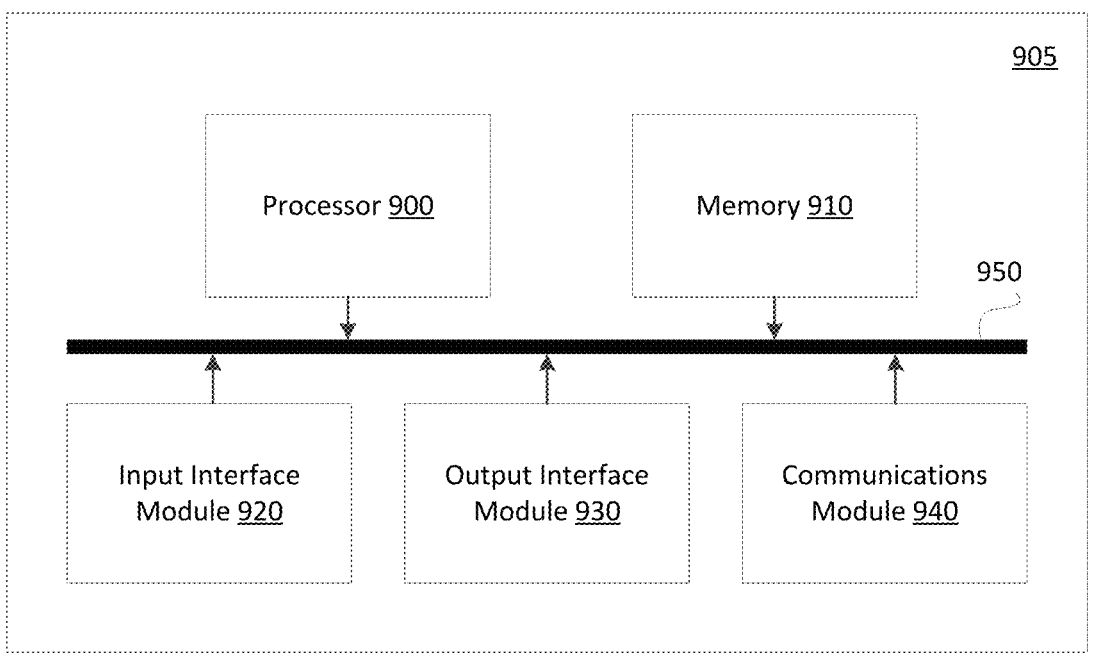
FIG. 9A is a high-level schematic diagram of an example computing device.

The above-described methods may be implemented by way of a suitably programmed computing device. FIG. 9A is a high-level operation diagram of an example computing device 905. The example computing device 905 includes a variety of modules. For example, as illustrated, the example computing device 905, may include a processor 900, a memory 910, an input interface module 920, an output interface module 930, and a communications module 940. As illustrated, the foregoing example modules of the example computing device 905 are in communication over a bus 950.

The processor 900 is a hardware processor. The processor 900 may for example, be one or more ARM, Intel x86, PowerPC processors or the like.

The memory 910 allows data to be stored and retrieved. The memory 910 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 905.

The input interface module 920 allows the example computing device 905 to receive input signals. Input signals may for example, correspond to input received from a user.

The input interface module 920 may serve to interconnect the example computing device 905 with one or more input devices. Input signals may be received from input devices by the input interface module 920. Input devices may for example, include one or more of a touchscreen input, keyboard, trackball or the like. In some embodiments, all or a portion of the input interface module 920 may be integrated with an input device. For example, the input interface module 920 may be integrated with one of the aforementioned examples of input devices.

The output interface module 930 allows the example computing device 905 to provide output signals. Some output signals may for example, allow provision of output to a user. The output interface module 930 may serve to interconnect the example computing device 905 with one or more output devices. Output signals may be sent to output devices by output interface module 930. Output devices may include, for example, a display screen such as, for example, a liquid crystal display (LCD), a touchscreen display. Additionally, or alternatively, output devices may include devices other than screens such as, for example, a speaker, indicator lamps (such as for example, light-emitting diodes (LEDs)), and printers. In some embodiments, all or a portion of the output interface module 930 may be integrated with an output device. For example, the output interface module 930 may be integrated with one of the aforementioned example output devices.

The communications module 940 allows the example computing device 905 to communicate with other electronic devices and/or various communications networks. For example, the communications module 940 may allow the example computing device 905 to send or receive communications signals. Communications signals may be sent or received according to one or more protocols or according to one or more standards. For example, the communications module 940 may allow the example computing device 905 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 940 may allow the example computing device 705 to communicate using near-field communication (NFC), via Wi-Fi™, using Bluetooth™ or via some combination of one or more networks or protocols. Contactless payments may be made using NFC. In some embodiments, all or a portion of the communications module 940 may be integrated into a component of the example computing device 905. For example, the communications module may be integrated into a communications chipset.

Software comprising instructions is executed by the processor 900 from a computer-readable medium. For example, software may be loaded into random-access memory from persistent storage of memory 910. Additionally, or alternatively, instructions may be executed by the processor 900 directly from read-only memory of memory 910.

Figure 9B:
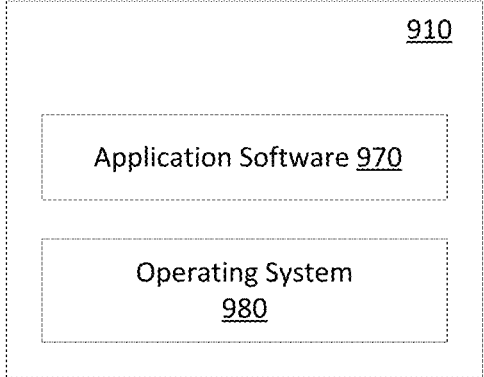
FIG. 9B shows a simplified organization of software components stored in a memory of the computing device of FIG. 9A.

FIG. 9B depicts a simplified organization of software components stored in memory 910 of the example computing device 905. As illustrated these software components include an operating system 980 and application software 970.

The operating system 980 is software. The operating system 980 allows the application software 970 to access the processor 900, the memory 910, the input interface module 920, the output interface module 930, and the communications module 940. The operating system 980 may be, for example, Apple™ OS X, Android™, Microsoft™ Windows™, a Linux distribution, or the like.

The application software 970 adapts the example computing device 905, in combination with the operating system 980, to operate as a device performing particular functions.

Example E-Commerce Platform

Although not required, in some embodiments, the methods disclosed herein may be performed on or in association with an e-commerce platform. An example of an e-commerce platform will now be described.

Figure 10:
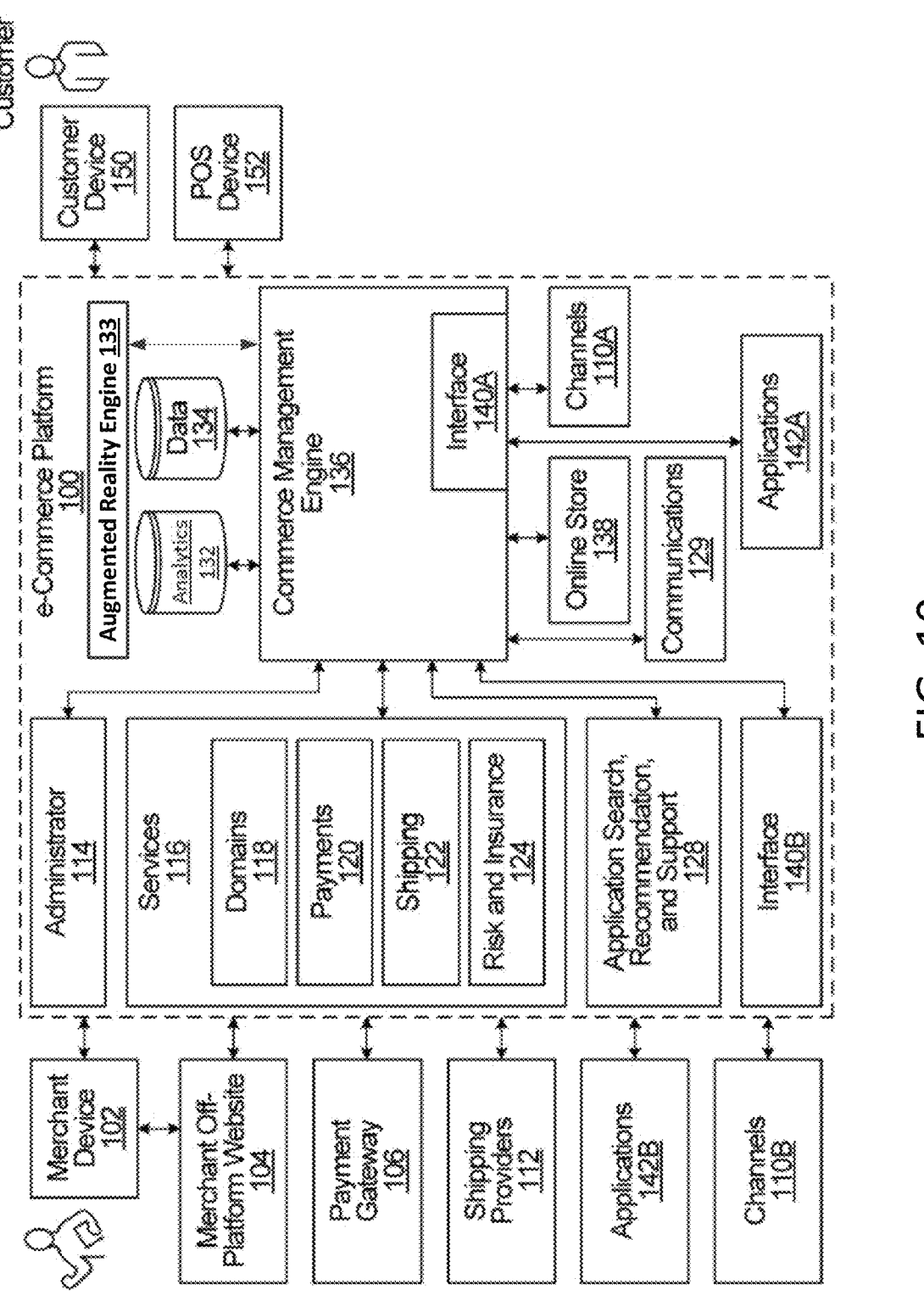
FIG. 10 is a block diagram of an e-commerce platform, in accordance with an example embodiment.

FIG. 10 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as an AR device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may in some embodiments, additionally or alternatively, be provided by one or more providers/entities.

In the example of FIG. 10, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to AR devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings that may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 11:
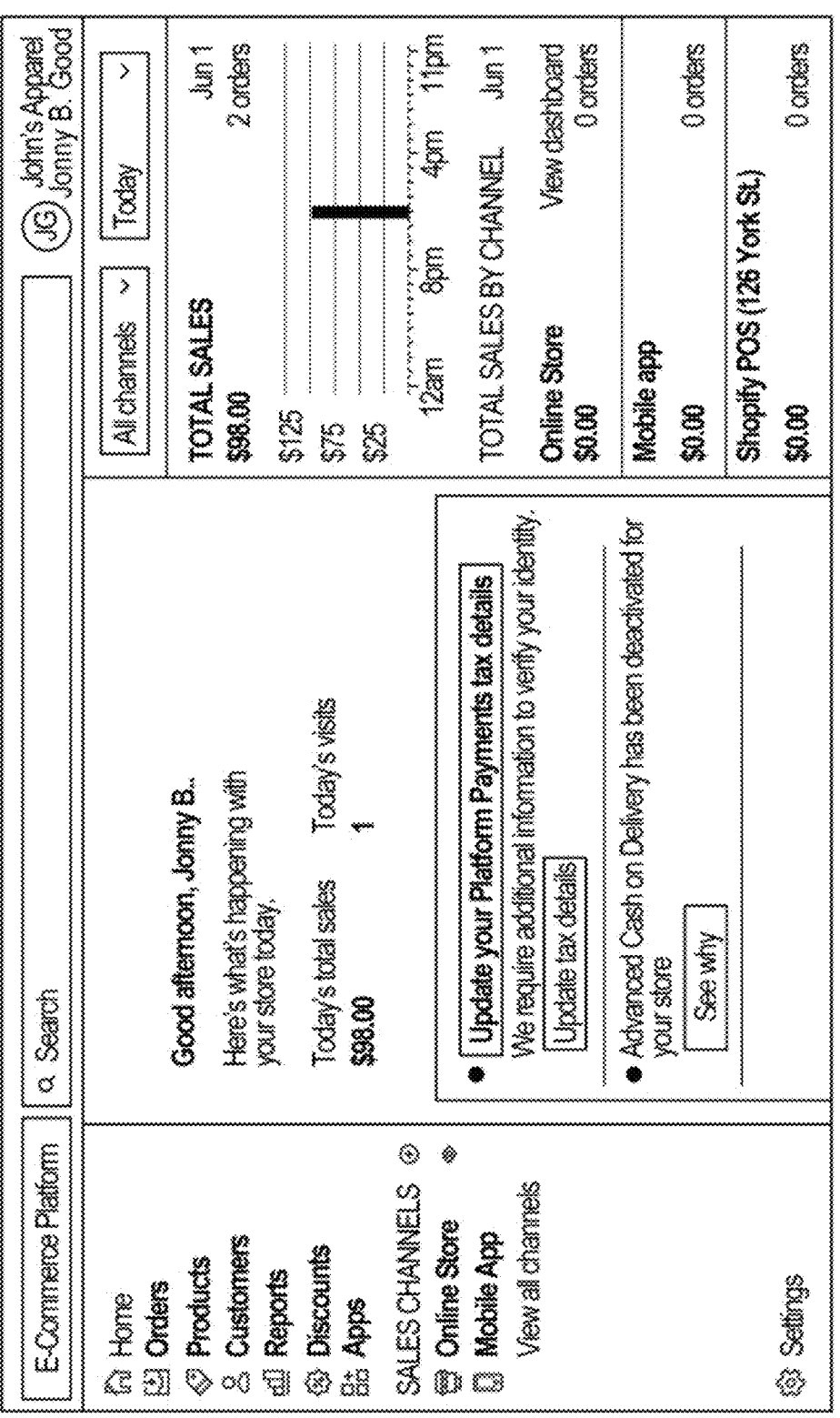
FIG. 11 is an example of a home page of an administrator, in accordance with an example embodiment.

FIG. 11 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 11. Sections of the administrator 114 may include various interfaces for accessing and managing core aspects of a merchant's business, including orders, products, customers, available reports and discounts. The administrator 114 may additionally or alternatively, include interfaces for managing sales channels for a store including the online store 138, mobile application(s) made available to customers for accessing the store (Mobile App), POS devices, and/or a buy button. The administrator 114 may additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 10, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

The e-commerce platform 100 may implement an augmented reality engine 133 which may be configured to support at least some of the functions of the AR engine 210 of FIG. 2 described above.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
obtaining image data from a plurality of cameras providing views of a designated assembly zone;
updating a three-dimensional model of an assembly of a structure based on the obtained image data;
determining locations of one or more components of sub-assemblies of the assembly based on the updated three-dimensional model of the assembly;
identifying assemblers associated with one or more assembly steps;
determining relative position information indicating positions of the identified assemblers with respect to the locations of the components of the sub-assemblies; and
determining, for each of one or more of the identified assemblers, a respective subset of all assembly instructions to assign to the assembler based on the relative position information.

2. The method of claim 1, wherein the plurality of cameras includes cameras associated with augmented reality devices that are detected to be in or within a vicinity of the assembly zone.

3. The method of claim 1, wherein the plurality of cameras includes one or more cameras that are statically positioned in or within a vicinity of the assembly zone.

4. The method of claim 1, wherein determining the locations of the one or more components of the sub-assemblies comprises:
identifying a first subregion of the assembly zone using the updated three-dimensional model; and
performing image analysis of video feeds of one or more cameras providing a view of the first subregion.

5. The method of claim 1, further comprising:
receiving a request to locate a first component; and
responsive to receiving the request, presenting, via an AR device associated with an assembler in the assembly zone, an indication of a location of the first component.

6. The method of claim 5, further comprising, before receiving a request to locate the first component:
obtaining subsequent image data from the plurality of cameras;
based on the obtained subsequent image data, determining that the first component is not at the location; and
updating the three-dimensional model to include an indicator of a change in location of the first component.

7. The method of claim 5, wherein the indication comprises a graphical indicator of the location of the component that is overlaid on a view of the real-world space.

8. The method of claim 1, wherein identifying the assemblers comprises detecting that an assembler has joined a first assembly process.

9. The method of claim 8, wherein detecting that an assembler has joined the first assembly process comprises detecting one or more of: input of a code; login to a shared project space; a defined object in a camera feed associated with the assembler; defined audio cues; or calibration by contact.

10. The method of claim 1, wherein identifying the assemblers comprises determining that one or more entities that are prompted to join a first assembly process based on their current locations have joined the first assembly process.

11. The method of claim 1, further comprising causing to be displayed, via an AR device associated with the assembler, virtual guidance corresponding to the respective subset of assembly instructions.

12. The method of claim 1, further comprising:
monitoring completion progress of the identified assemblers in completing their respective assigned assembly tasks; and
based on the monitoring, determining subsequent assembly instructions for assigning to one or more of the identified assemblers.

13. The method of claim 1, further comprising:
identifying a first one of the assemblers to receive location information for the first components; and
causing to be displayed, via an AR device associated with the first assembler, a graphical indication of the location of the first component.

14. The method of claim 13, wherein the first one of the assemblers is identified based on determining proximity of one or more of the identified assemblers to the location of the first component.

15. The method of claim 13, wherein the first one of the assemblers is identified based on determining an identity of an assembler to receive assembly instructions associated with the first component.

16. The computing system of claim 15, wherein the relative position information further indicates positions of the identified assemblers with respect to each other.

17. The method of claim 1, wherein the relative position information further indicates positions of the identified assemblers with respect to each other.

18. A computing system, comprising:
a processor; and
a memory coupled to the processor, the memory storing computer-executable instructions that, when executed by the processor, configure the processor to:
obtain image data from a plurality of cameras providing views of a designated assembly zone;
update a three-dimensional model of an assembly of a structure based on the obtained image data;
determine locations of one or more components of sub-assemblies of the assembly based on the updated three-dimensional model of the assembly;
identify assemblers associated with one or more assembly steps;
determine relative position information indicating positions of the identified assemblers with respect to the locations of the components of the sub-assemblies; and
determine, for each of one or more of the identified assemblers, a respective subset of all assembly instructions to assign to the assembler based on the relative position information.

19. The computing system of claim 18, wherein determining the location of a component of a sub-assembly comprises:
identifying a first subregion of the assembly zone using the updated three-dimensional model; and
performing image analysis of video feeds of one or more cameras providing a view of the first subregion.

20. A non-transitory processor-readable medium storing computer-executable instructions that, when executed by a processor, are to cause the processor to:

obtain image data from a plurality of cameras providing views of a designated assembly zone;

update a three-dimensional model of an assembly of a structure based on the obtained image data;

determine locations of one or more components of sub-assemblies of the assembly based on the updated three-dimensional model of the assembly;

identify assemblers associated with one or more assembly steps;

determine relative position information indicating positions of the identified assemblers with respect to the locations of the components of the sub-assemblies; and determine, for each of one or more of the identified assemblers, a respective subset of all assembly instructions to assign to the assembler based on the relative position information.

* * * * *